United States Patent
Winzen et al.

[11] Patent Number: 5,959,383
[45] Date of Patent: Sep. 28, 1999

[54] THRUST BEARING FOR AN OPEN-END SPINNING ROTOR

[75] Inventors: Lothar Winzen, Erkelenz; Wolfgang Radermacher, Wegberg, both of Germany

[73] Assignee: W. Schlafhorst AG & Co., Moenchengladbach, Germany

[21] Appl. No.: 08/994,694

[22] Filed: Dec. 19, 1997

[30] Foreign Application Priority Data

Dec. 20, 1996 [DE] Germany .............................. 196 53 385
Aug. 11, 1997 [DE] Germany .............................. 197 34 637

[51] Int. Cl.$^6$ .................................. H02K 5/16; H02K 7/09
[52] U.S. Cl. ........................ 310/90.5; 310/51; 310/67 R; 310/89; 310/90
[58] Field of Search ............................. 310/90, 90.5, 89, 310/51, 67 R

[56] References Cited

U.S. PATENT DOCUMENTS

| | | | |
|---|---|---|---|
| 3,080,170 | 3/1963 | Colby | 277/93 |
| 4,081,705 | 3/1978 | Johnson | 310/90 |
| 4,988,906 | 1/1991 | Littlefield | 310/90.5 |
| 5,235,227 | 8/1993 | Fazekas | 310/51 |
| 5,376,850 | 12/1994 | Elsing et al. | 310/67 R |
| 5,394,044 | 2/1995 | Yamamura | 310/90.5 |
| 5,622,040 | 4/1997 | Preutenborbeck et al. | 57/406 |
| 5,668,425 | 9/1997 | Marioni et al. | 310/162 |
| 5,762,424 | 6/1998 | Harris et al. | 384/299 |

FOREIGN PATENT DOCUMENTS

| | | |
|---|---|---|
| 25 14 734 A1 | 10/1976 | Germany . |
| 26 32 976 A1 | 1/1978 | Germany . |
| 26 34 070 A1 | 2/1978 | Germany . |
| 26 39 763 A1 | 3/1978 | Germany . |
| 195 42 079 A1 | 6/1996 | Germany . |

*Primary Examiner*—Thomas M. Dougherty
*Assistant Examiner*—Tran N Nguyen
*Attorney, Agent, or Firm*—Kennedy Covington Lobdell & Hickman, LLP

[57] ABSTRACT

A thrust bearing for an open-end spinning rotor (1) supported by its rotor shaft (2) in the bearing slot of a support-disk bearing arrangement (4). The thrust bearing has a magnetic bearing system (10) or (25) comprising magnetic support elements (12), (13) stationarily arranged on a thrust bearing housing (11) and a rotating magnetic bearing device (14) fastened to rotor shaft (2). Bearing element (15) of magnetic bearing device (14) is releasably connected to rotor shaft (2) via an elastic connection (20), (21) positively supported in corresponding receiving grooves (22), (23) of either the rotor shaft or the magnetic bearing device (14).

7 Claims, 4 Drawing Sheets

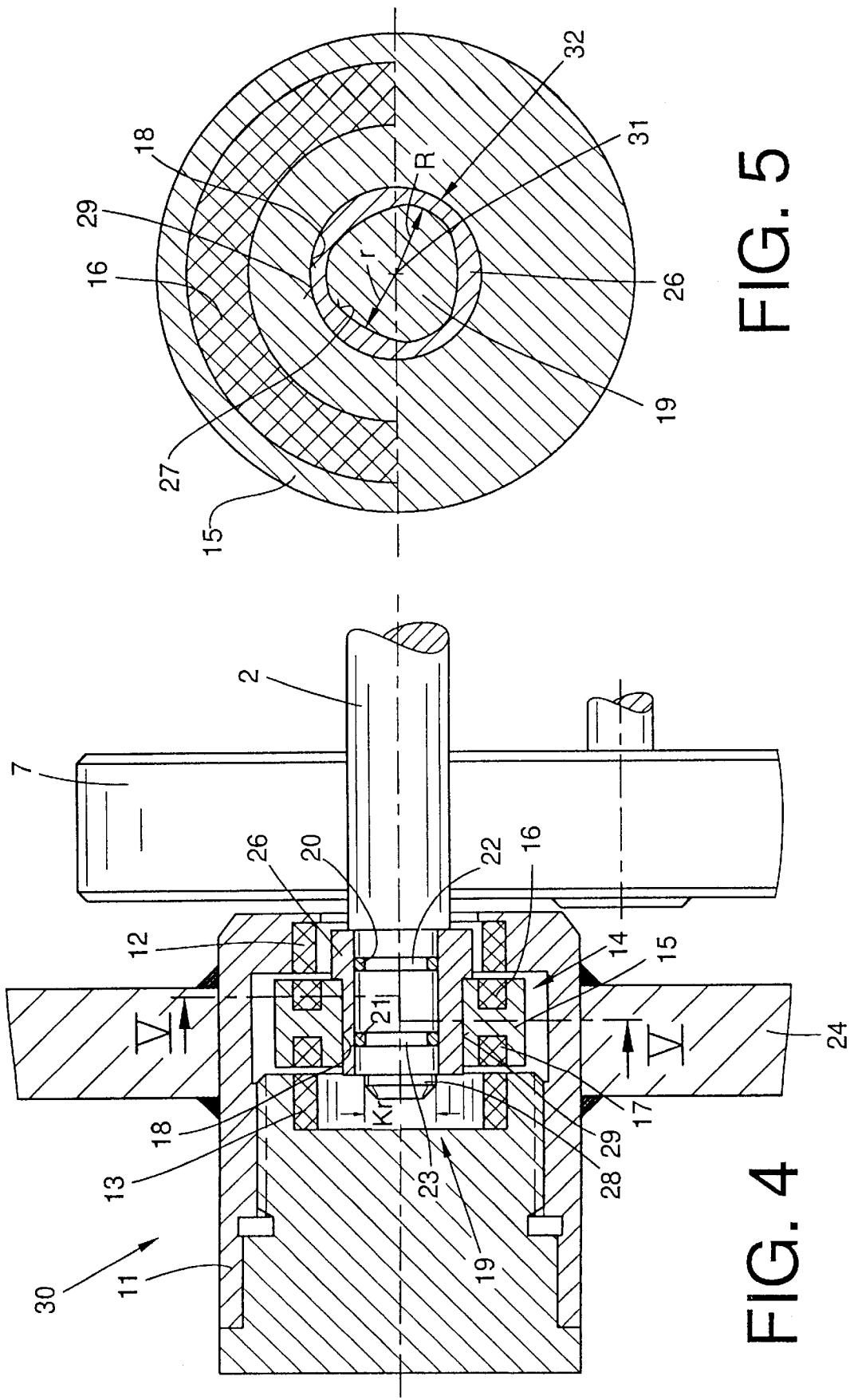

THRUST BEARING FOR AN OPEN-END SPINNING ROTOR

BACKGROUND OF THE INVENTION

The present invention relates to a thrust bearing for an open-end spinning rotor whose rotor shaft is supported in a wedge-like gap formed between pairs of support disks.

In conventional high-speed open-end rotor spinning machines, the spinning rotor is supported by a support-disk bearing arrangement wherein two pairs of adjacent support disks or rollers define a wedge-like gap forming a bearing slot in which the rotor shaft rests and is fixed via a thrust bearing arranged on the end of the shaft opposite the rotor. The two support-disk pairs are arranged on adjacent non-parallel shafts whose axes are thereby crossed to exert an axial thrust on the rotor shaft for holding the rotor shaft in contact with a mechanical thrust bearing. This type of support-disk bearing arrangement of open-end spinning rotors is described, for example, in German Patent Publication DE 25 14 734 C2, and has proven itself in practice to make possible rotor speeds of greater than 100000 rpm.

However, a disadvantage in this type of spinning-rotor support-disk bearing arrangement is that friction occurs by the contact between the peripheral surfaces of the support disks and the rotor shaft because of the crossing non-parallel axes of the support disks, which results in a heating of the peripheral contact surfaces of the support disks. As a result of the frictional heat, not only are the contact surfaces of the support disks considerably stressed but also additional energy is needed to overcome this friction. Moreover, mechanical thrust bearings are subjected to a not inconsiderable wear even when properly lubricated.

Attempts have therefore already been undertaken in the past to replace these mechanical thrust bearings by wear-free thrust bearings, e.g. pneumatic bearings or magnetic bearings. Since an axial thrust of the rotor shaft in the direction of the bearing is also necessary in the case of pneumatic bearings, it has not been possible to eliminate the above-described problems with such pneumatic bearings.

German Patent Publication DE 26 34 070 A1 describes an open-end rotor spinning device having a support-disk bearing arrangement in which the rotor shaft of the spinning rotor is fixed in axial direction by a magnetic bearing. In this known device, rod-shaped permanent magnets are mounted to the end area of the rotor shaft in axial alignment with the spinning rotor to rotate integrally therewith and oppositely polarized permanent magnetic rings are arranged stationarily in the housing of the thrust bearing surrounding these rod-shaped permanent magnets. However, a magnetic bearing arrangement of this design does not result in a sufficient axial fixing of the rotor shaft on the support-disk bearing arrangement.

German Patent Publication DE 26 39 763 A1 describes a further development of an axial magnetic bearing for spinning rotors wherein annular permanent magnets are fastened on the rotor shaft and are enclosed by permanent magnet rings which are stationarily fixed at a slight axial interval on a carrier element. The stationary permanent magnet rings form the support for the magnet rings rotating with the rotor shaft. The polarity of the permanent magnet rings opposite each other in axial direction is selected in such a manner in this instance that the magnet rings repel each other. A wear-free and reliable fixing of the rotor shaft on the support-disk bearing arrangement is achieved with such a device. However, the replacement of the spinning rotor becomes extremely complicated and is not possible at a justifiable expense with such a design of the magnetic bearing arrangement.

German Patent Publication DE 195 42 079 A1, and corresponding U.S. Pat. No. 5,622,040, describes an axial magnetic bearing device in which the magnetic bearing elements forming the support are arranged in a stationary manner on the housing of the thrust bearing. Various variants are presented regarding the manner of fastening of the magnetic bearing component to the rotor shaft for rotating with the spinning rotor, including both non-positive and positive but releasable fastening of the rotating magnetic bearing part. This known magnetic bearing device makes possible a correct axial fixing of the rotor shaft on the support-disk bearing arrangement and assures that the spinning rotor can be readily installed and removed as needed. However, the non-positive fastening of the magnetic bearing component to the rotor shaft, which is advantageous in principle and which can be readily released in case of need, still warrants improvement.

SUMMARY OF THE INVENTION

In light of the state of the art discussed above, it is an object of the present invention to provide an improved magnetic thrust bearing for open-end spinning rotors.

The invention achieves this objective by providing a thrust bearing for an open-end spinning rotor assembly which basically has a rotor shaft supported in a bearing slot defined by at least one pair of adjacent support disks, wherein the thrust bearing comprises a bearing housing stationarily supporting at least one first magnetic element and a magnetic bearing device supporting at least one second magnetic element, with the magnetic bearing device being disposed within the bearing housing with the polarity of the respective magnetic elements arranged to dispose the magnetic bearing device for rotation relative to the bearing housing. In accordance with the present invention, a receiving groove is formed in one of the magnetic bearing device and a bearing portion of the rotor shaft, and means is positioned in the groove for establishing an elastic connection between the magnetic bearing device and the bearing portion of the rotor shaft for attachment of the rotor shaft to the magnetic bearing device for integral rotation thereof while still being releasable when necessary for removal of the rotor assembly.

This design of a magnetic thrust bearing in accordance with the invention not only has the advantage that such a bearing operates without wear and thus has an almost unlimited service life but, in addition, the elastic connection means assures that, on the one hand, the magnetic bearing device rotating with the spinning rotor is reliably fixed on the rotor shaft and, on the other hand, the spinning rotor can nevertheless be easily removed and replaced. The magnetic bearing device is formed as a bearing element with permanent magnet rings which can be reliably fixed on the rotor shaft via the elastic connection means but can remain in its position between the stationary magnetic support elements within the thrust bearing housing when the spinning rotor is removed. The bearing element is preferably manufactured from aluminum with a central through-bore formed with a tapered chamfer at its outward end which makes it distinctly easier to insert the rotor shaft into the bore of the bearing element. As a result of the elastic connection means, the installation and removal of the spinning rotor are not hindered thereby.

In the installed state of the spinning rotor, the central through-bore of the bearing element receives a reduced diameter extension portion on the end of the rotor shaft opposite the rotor with the elastic connection means being positively positioned in mated receiving grooves, whereby the rotor shaft and the spinning rotor are reliably positioned within the bearing even after multiple installations and removals of the spinning rotor.

In a preferred embodiment, the elastic connection means comprises annular fastening elements which make it relatively simple to assure that the rotational axis of the spinning rotor is precisely maintained for rotation without vibration or imbalance even after the fastening of the magnetic bearing device onto the rotor shaft. Specifically, the occurrence of an imbalance of the spinning rotor due to the fastening elements must absolutely be avoided, given the high speeds of such open-end spinning rotors. O-rings are especially suitable as the annular fastening parts since these parts can be positively seated and locked in positioning grooves to fix the elements axially relative to the rotor shaft in a relatively simple manner and the elasticity of such O-rings assures a reliable non-positive connection between the rotor shaft and the magnetic bearing device.

The O-rings can be positioned either in receiving grooves arranged in the extension portion of the rotor shaft or in receiving grooves formed into the through-bore of the magnetic bearing device. An embodiment with the O-rings fitted into the rotor shaft has the advantage that the fastening parts can be readily checked for any damage whenever the rotor and its shaft are removed and can be then be replaced without problems if necessary.

A further advantageous aspect of the invention provides for the extending end portion of the rotor shaft to have an out-of-round, i.e., non-circular, peripheral profile, and for the magnetic bearing device to have a correspondingly designed bushing sleeve formed with a through-bore having a mating non-circular profile press-fitted into the bearing. Such an embodiment of the rotor-shaft extension and the magnetic bearing device results in a connection which is positive in the circumferential direction of rotation and thereby absolutely prevents relative rotation of the mating components. The necessary ability of the connection to be releasable in the axial direction remains unaffected.

The extending end portion of the rotor shaft is preferably configured with a polygonal profile, which in its most basic form may be of an equilateral triangular shape with its sides and corners convexly curved to create an out-of-round profile whose overall diametric thickness measured through the center is equally great at all points. In comparison to other types of positive connections between the extending portion of the rotor shaft and the magnetic bearing, such a polygonal profile has the advantage that the connection thereby formed is practically free of notches which provides favorable strength characteristics and has a long service life. Moreover, the production of a polygonal profile is relatively simple, even though requiring special machines, and thus relatively economical.

The rotor shaft preferably comprises a head portion on its end the radius of which is smaller than or equal to the smallest radial dimension of the polygonal profile. A head portion designed in this manner makes it quite easy to insert the extending portion of the rotor shaft, particularly its polygonal extent, into the corresponding bore of the bushing fixed on the rotatable support element of the magnetic bearing device.

Further details of the invention will be described and understood from the following exemplary embodiments explained with reference made to the drawings.

BRIEF DESCRIPTION OF THE DRAWINGS

FIG. 4 is another partially sectioned side view similar to FIGS. 2 and 3 showing a third embodiment of magnetic thrust bearing system for a support-disk bearing arrangement for a spinning rotor and rotor shaft assembly, in accordance with the present invention.

FIG. 5 is a radial cross-section of the magnetic bearing system according to FIG. 4 taken along section line V—V.

DETAILED DESCRIPTION OF THE PREFERRED EMBODIMENT

Figure 1:
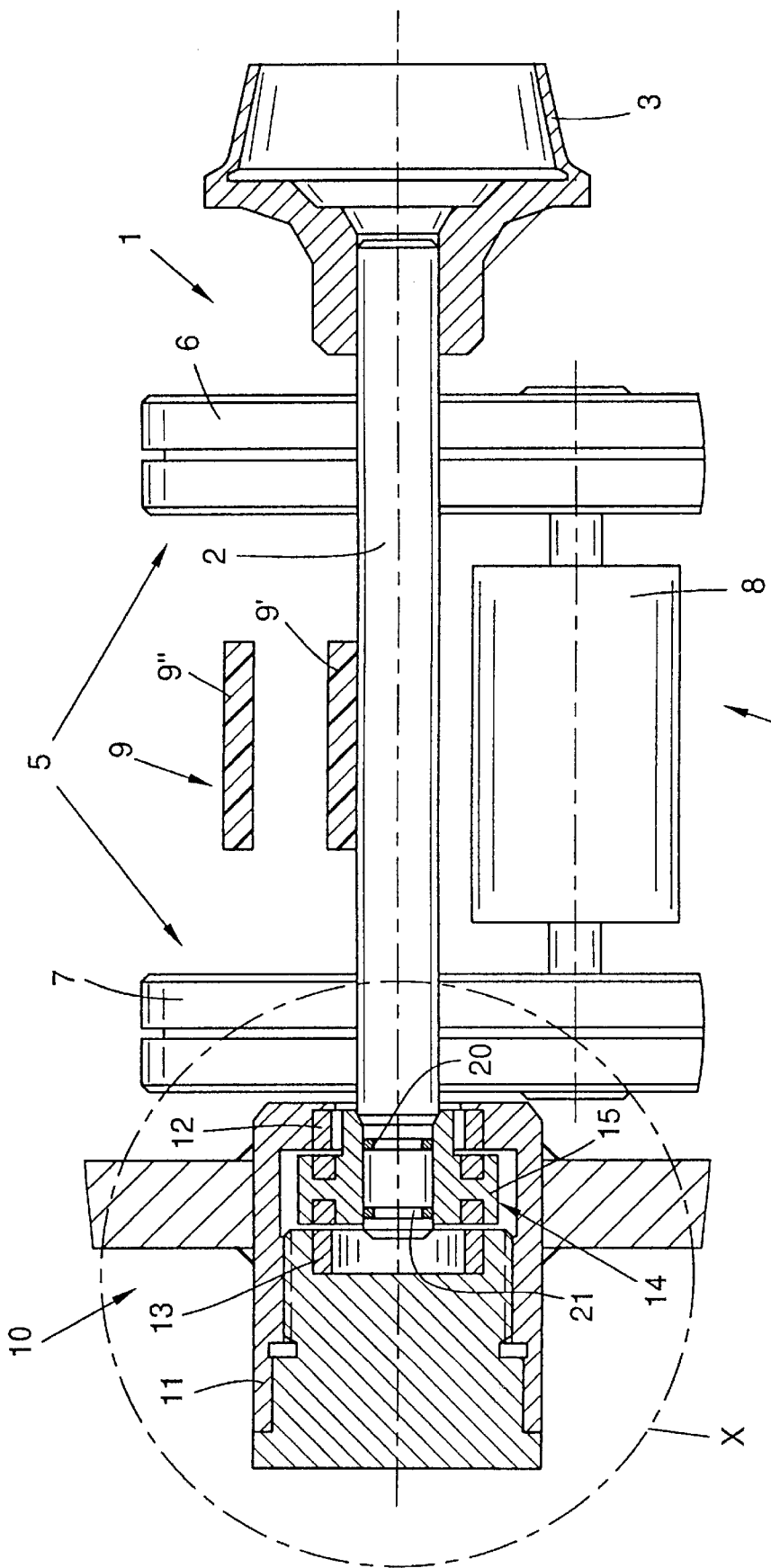
FIG. 1 is a side view, partially in axial cross-section, of a spinning rotor and rotor shaft assembly supported by a support-disk bearing arrangement with an axial magnetic thrust bearing system in accordance with one embodiment of the present invention.

Referring now to the accompanying drawings and initially to FIG. 1, spinning rotor assembly is identified as a whole by reference numeral 1 and basically comprises, as is customary, a rotor shaft 2 coaxially affixed to a spinning cup 3. Rotor shaft 2 is supported in a bearing slot formed as a wedge-like gap defined by a support-disk bearing arrangement 4 comprised of two pairs of adjacently disposed support disks or rollers, of which only one support-disk pair 5 comprised of support disks 6,7 located behind rotor shaft 2 on a common respective bearing 8 is shown in FIG. 1. Rotor shaft 2 of spinning rotor assembly 1 is frictionally driven in known manner via a tangential belt 9 whose drive run is designated by 9' and whose opposite return run is designated by 9".

Figure 2:
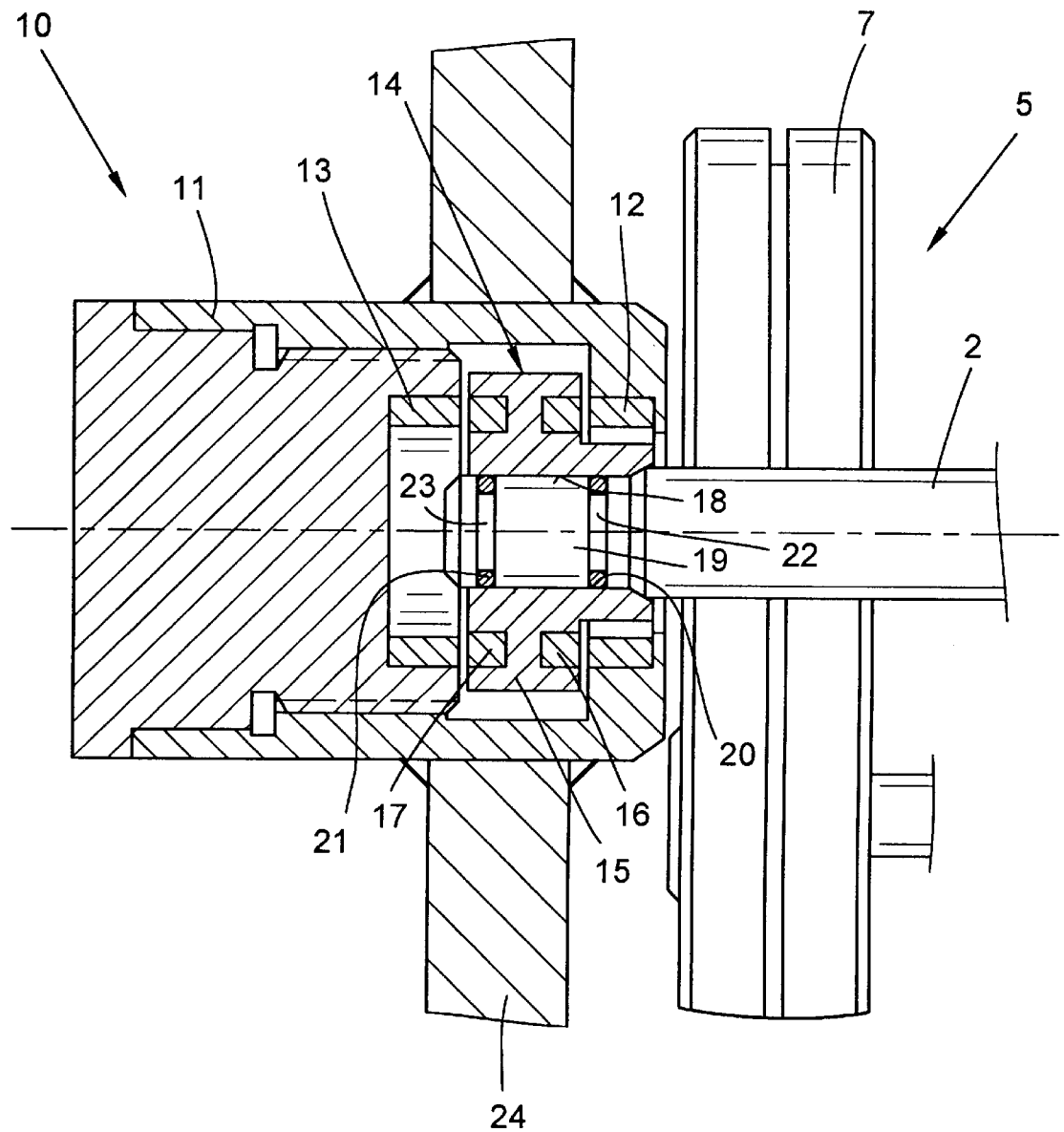
FIG. 2 is a partially sectioned side view of the magnetic thrust bearing system according to FIG. 1 on a larger scale.
Figure 3:
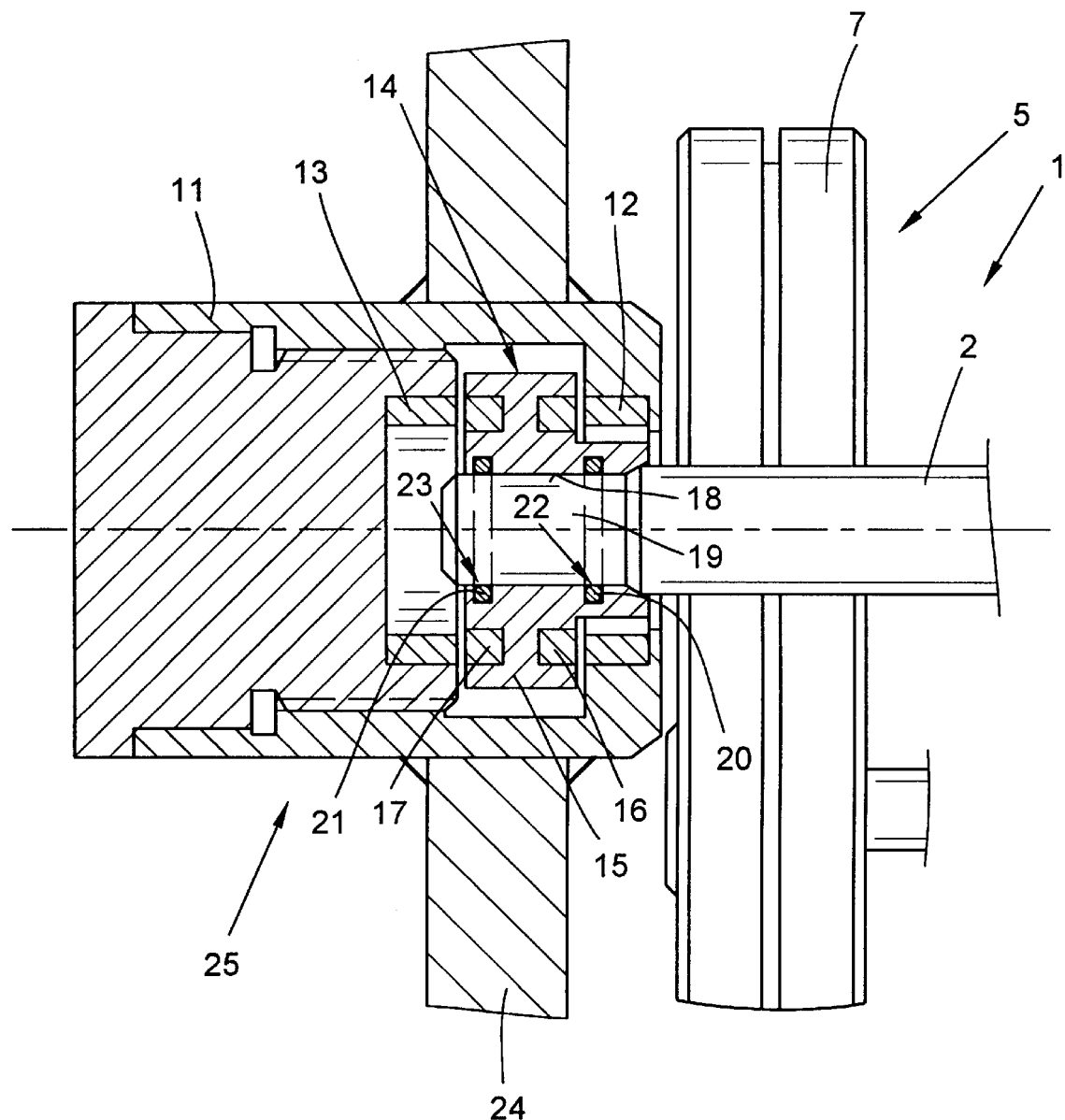
FIG. 3 is another partially sectioned side view similar to FIG. 2 showing a second embodiment of magnetic thrust bearing system for a support-disk bearing arrangement for a spinning rotor and rotor shaft assembly, in accordance with the present invention.

While the spinning rotor assembly 1 is rotating at a high speed on support-disk bearing arrangement 4, the rotor assembly 1 is fixed in its axial direction either, as is shown in FIGS. 1 and 2, by a magnetic thrust bearing system 10 or, as is shown in FIG. 3, by a magnetic thrust bearing system 25.

As best seen in FIG. 2, magnetic thrust bearing system 10 comprises a support component held stationarily in a thrust-bearing housing 11 and preferably comprised of ring magnets 12, 13, e.g., permanent magnet rings, and a magnetic bearing device 14 which is fixed on rotor shaft 2 in a non-positive selectively releasable manner to rotate with the spinning rotor. Magnetic bearing device 14 preferably also comprises two ring magnets 16, 17 arranged in bushing-like support element 15. The polarity of these rotating permanent magnets 16, 17 is selected in relation to the polarity of the stationarily arranged permanent magnet rings 12, 13 of the support such that the oppositely facing magnet rings 12, 16 and 13, 17, are of the same polarity so as to repel one another.

Support element 15 is formed with a through-bore 18 which receives a reduced diameter extension portion 19 at the free extending end of the rotor shaft 2 to fix the support element thereon in a non-positive and readily releasable manner.

Elastic O-rings 20, 21 are preferably provided as fastening elements for securing the support element 15 on the shaft extension 19, the rings being positively positioned in accordance with the exemplary embodiment shown in FIGS. 1 and 2 in receiving grooves 22, 23 formed annularly in extension 19 of rotor shaft 2. The dimensioning of these O-rings 20, 21 is selected such that the O-rings are fixed in their installed position with initial tension in the receiving grooves. Specifically, the inside diameter of the relaxed O-rings is somewhat smaller than the diameter of receiving grooves 22, 23 at their groove bottom. The outside diameter of O-rings 20, 21 is coordinated with the inside diameter of throughbore 18 of support element 15, such that the outside diameter of O-rings 20, 21 is somewhat greater than the through-bore to cause the O-rings 20, 21 to be compressed during the insertion of extension 19 into hole 18. The elastic action thereby resulting from the O-rings holds support element 15 reliably in its installed position on extension 19 of rotor shaft 2.

The free end of the extension 19 of the rotor shaft 2 forms a narrowingly tapered head portion which makes it quite easy to insert the extending portion of the rotor shaft into the corresponding bore of the support element 15. Additionally, the support element 15 is preferably manufactured from aluminum formed with a tapered chamfer surrounding the forward end of the central through-bore 18 which makes it distinctly easier to insert the rotor shaft 2 into the support element.

FIG. 3 shows a second embodiment of such a magnetic bearing system indicated as a whole at 25. Magnetic bearing system 25 differs from magnetic bearing system 10 according to FIGS. 1 and 2 essentially only as regards the positioning of O-rings 20, 21 and the arrangement of the associated receiving grooves 22, 23. As FIG. 3 shows, in this embodiment the receiving grooves 22, 23 are formed into the through-bore of support element 15 while extension 19 on rotor shaft 2 has a smooth surface.

FIGS. 4 and 5 show another embodiment of a magnetic bearing system in accordance with the invention, indicated as a whole at 30. Magnetic bearing system 30 differs from magnetic bearing system 10 of FIGS. 1 and 2 essentially in the configuration of rotor-shaft extension 19 and the mating through-bore of the support element 15. As can be seen from FIG. 5 in particular, rotor shaft extension 19 has an essentially polygonal profile 32, i.e., a shape which is non-circular and therefore out-of-round, which in the illustrated embodiment is in the form of an equilateral triangle with the corners and sides being convexly rounded. In this manner, the overall diametric thickness of the rotor shaft extension 19 measured through the center axis thereof, represented e.g. in FIG. 5 by the sum of the radial dimensions r and R, is essentially the same at all points.

Support element 15, which receives permanent-magnet rings 16, 17 and rotates with rotor shaft 19 in the operating state, has an annular bushing 26 with a circular outside circumference 29 press-fitted into the circular through-bore 18 of the support element 15 with an appropriate fit selection s7/H7 of these structural parts to assure a stable, rotation-proof connection of the two structural parts 15 and 26.

The annular configuration of the bore 27 through the bushing 26, however, is non-circular and instead is a polygonal shape mated to that of the extension portion 19 of the rotor shaft 2, i.e., of an equilateral triangular shape, for press fitting of the shaft extension 19 into the bushing 26. In this manner, a positive connection is produced between rotor shaft 2 and rotatable support element 15 of magnetic bearing system 30 in the circumferential direction of rotation which prevents relative rotation between these components. The axial, releasable fixing of support element 15 and bushing 26 on extension 19 of rotor shaft 2 is still achieved via O-rings 20, 21 or comparable fastening means, as in the exemplary embodiment according to FIGS. 1 and 2.

Preferably, the rotor shaft 2 has a head portion 28 on the outermost free end of the extension 19 the radius of which head portion 28 is smaller than or equal to the smallest radial dimension of the polygonal profile. The head portion 28 in this manner makes it quite easy to insert the extending portion of the rotor shaft 2, particularly its polygonal extent, into the corresponding bore of the bushing 26.

Although two O-rings are shown in each of the exemplary embodiments described above, the invention is not limited to a certain number of such elastic fastening means. The concept and substance of the invention is also realized if only one or if more than two such fastening means are used. Instead of O-rings with a circular cross section, annular fastening parts with other cross-sectional shapes can also be used. Thus, it is quite conceivable, for example, to use annular fastening parts with a cross section in the shape of an ellipse, semicircle or the like.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A thrust bearing for an open-end spinning rotor assembly having a rotor shaft supported in a bearing slot defined by at least one pair of adjacent support disks, the thrust bearing comprising a bearing housing stationarily supporting at least one first magnetic element and a magnetic bearing device supporting at least one second magnetic element, the magnetic bearing device being disposed within the bearing housing with the polarity of the respective magnetic elements arranged to dispose the magnetic bearing device for rotation relative to the bearing housing, a receiving groove formed in one of the magnetic bearing device and a bearing portion of the rotor shaft, and annular resilient O-ring means positioned in the groove for establishing an elastic connection between the magnetic bearing device and the bearing portion of the rotor shaft for releasable attachment of the rotor shaft to the magnetic bearing device for integral rotation thereof.

2. The thrust bearing according to claim 1, wherein the receiving groove is formed in the bearing portion of the rotor shaft.

3. The thrust bearing according to claim 1, wherein the receiving groove is formed in the magnetic bearing device.

4. The thrust bearing according to claim 1, wherein the bearing portion of the rotor shaft has an non-circular circumferential profile.

5. The thrust bearing according to claim 4, wherein the non-circular circumferential profile of the bearing portion of the rotor shaft is a polygonal profile.

6. The thrust bearing according to claim 5, wherein the bearing portion of the rotor shaft includes a head portion of a diametric dimension smaller than the smallest diametric dimension of the polygonal profile.

7. The thrust bearing according to claim 5, wherein the bearing portion of the rotor shaft includes a head portion of a diametric dimension essentially equal to the smallest diametric dimension of the polygonal profile.

* * * * *